(12) United States Patent
Miyata et al.

(10) Patent No.: US 9,784,629 B2
(45) Date of Patent: Oct. 10, 2017

(54) CLAMPING-TYPE TENSILE FORCE MEASUREMENT DEVICE

(71) Applicant: BANDO CHEMICAL INDUSTRIES, LTD., Kobe-shi, Hyogo (JP)

(72) Inventors: Hirofumi Miyata, Hyogo (JP); Yuta Hamasaki, Hyogo (JP); Masanobu Eguchi, Tokyo (JP); Haruki Shikasho, Tokyo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 15/400,209

(22) Filed: Jan. 6, 2017

(65) Prior Publication Data

US 2017/0115173 A1    Apr. 27, 2017

Related U.S. Application Data

(63) Continuation of application No. PCT/JP2016/000796, filed on Feb. 16, 2016.

(30) Foreign Application Priority Data

Feb. 16, 2015   (JP) ................................ 2015-027693

(51) Int. Cl.
| | |
|---|---|
| *G01L 1/22* | (2006.01) |
| *G01L 5/10* | (2006.01) |
| *G01L 5/03* | (2006.01) |

(52) U.S. Cl.
CPC . *G01L 5/10* (2013.01); *G01L 5/03* (2013.01)

(58) Field of Classification Search
CPC .................................... G01L 5/03; G01L 5/10

USPC ...................... 73/862.392, 862.393, 862.474
See application file for complete search history.

(56) References Cited

U.S. PATENT DOCUMENTS

| | | | | |
|---|---|---|---|---|
| 3,631,715 A | * | 1/1972 | Isaac ......................... | G01L 5/03 73/862.02 |
| 3,830,101 A | * | 8/1974 | Frey ......................... | G01L 5/03 73/862.02 |
| 3,861,205 A | * | 1/1975 | Frey ..................... | A63C 11/265 73/862.02 |

(Continued)

FOREIGN PATENT DOCUMENTS

| | | |
|---|---|---|
| DE | 10-322700 A1 | 2/2004 |
| DE | 10-2004-008222 A1 | 9/2005 |

(Continued)

OTHER PUBLICATIONS

International Search Report and Written Opinion for corresponding application No. PCT/JP2016/000796, dated May 17, 2016.

*Primary Examiner* — Max Noori
(74) *Attorney, Agent, or Firm* — Maschoff Brennan

(57) ABSTRACT

Provided is a clamping-type tensile force measurement device configured to clamp a belt being used to lash a cargo and to measure a tensile force of the belt. The measurement device includes: a base having a pair of support rollers which are rotatable; and a lid connected to the base via a hinge portion such that the base and the lid form a foldable structure. A load cell is installed in a backside portion of the lid. A pressing plate having a pressing portion positioned to face a space between the pair of support rollers is provided on a backside of the lid.

4 Claims, 4 Drawing Sheets

(56) References Cited

U.S. PATENT DOCUMENTS

| | | | |
|---|---|---|---|
| 4,444,065 A * | 4/1984 | Okamuro | G01L 5/06 73/862.453 |
| 5,656,994 A | 8/1997 | Heninger | |
| 6,134,974 A | 10/2000 | Grover | |
| 6,209,401 B1 | 4/2001 | Bäcklund | |
| 6,508,114 B2 * | 1/2003 | Lawson | G01L 5/101 73/159 |
| 2004/0044455 A1 | 3/2004 | Ante et al. | |

FOREIGN PATENT DOCUMENTS

| | | |
|---|---|---|
| GB | 2 376 925 A | 12/2002 |
| JP | S61-52244 U | 4/1986 |
| JP | S62-9245 A | 1/1987 |
| JP | S63-75632 A | 4/1988 |
| JP | H01-162123 A | 6/1989 |
| JP | H09-5181 A | 1/1997 |
| JP | 2000-504842 A | 4/2000 |

\* cited by examiner

1

CLAMPING-TYPE TENSILE FORCE MEASUREMENT DEVICE

CROSS-REFERENCE TO RELATED APPLICATIONS

This is a continuation of International Application No. PCT/JP2016/000796 filed on Feb. 16, 2016, which claims priority to Japanese Patent Application No. 2015-027693 filed on Feb. 16, 2015. The entire disclosures of these applications are incorporated by reference herein.

BACKGROUND

The present invention relates to a clamping-type tensile force measurement device for measuring a tensile force of a belt being used to lash a cargo.

It has been known that safe transportation of cylindrical cargoes such as drums, pipes, and shafts requires these cargoes to be lashed with a certain tensile force during transportation. It is therefore necessary to firmly fasten a belt, which secures the cargoes, to a deck or any other appropriate place by using a lashing device or similar apparatus before transportation.

For example, a tensile force measurement device for cargo rope is known from Japanese Unexamined Patent Publication No. H01-162123. This tensile force measurement device is incorporated in a portion of cargo rope, and measurement of a tensile force of the cargo rope is implemented in parallel with lashing a cargo to, for example, a platform using a lashing device. It has also been known to provide the function of displaying tensile force to a lashing device itself having a handle for gradually tightening a belt.

However, according to these known techniques, such a tensile force measurement device or a lashing device having the function of displaying tensile force needs to be incorporated for each cargo. Therefore, these techniques are inapplicable to transportation of a large amount of cargo, such as transportation by ship or boat.

On the other hand, Japanese Unexamined Patent Publication No. S62-9245 (see, in particular, FIG. 3) and Japanese Unexamined Patent Publication No. H09-5181 describe different measurement devices. These devices include three rotatable rollers, and a belt is clamped between the three rollers, thereby measuring a tensile force of the belt.

SUMMARY

However, a clamping-type tensile force measurement device of the type described in Japanese Unexamined Patent Publication Nos. S62-9245 and H09-5181 usually has three rollers, all of which are rotatable to prevent errors in the results of tensile force measurement caused by frictional resistance. Therefore, in particular at a place where a belt is stretched diagonally, an operator has to measure the tensile force, while holding the tensile force measurement device in his/her hand. In a situation where one operator alone tightens a belt using a lashing device or a buckle, for example, the measurement device of this type disadvantageously makes it impossible for the operator to tighten the belt in parallel with checking the tensile force of the belt.

In view of the foregoing, it is therefore an object of the present invention to provide a tensile force measurement device which enables an operator to measure a tensile force of a belt being used to lash a cargo in parallel with performing an operation of tightening the belt.

To achieve the above object, the measurement device of the present invention is configured to be capable of holding a belt clamped between a pair of support rollers which are rotatable and a pressing portion.

Specifically, a first aspect of the present invention relates to a clamping-type tensile force measurement device for clamping a belt being used to lash a cargo and measuring a tensile force of the belt. The measurement device includes:

a base having a pair of support rollers which are rotatable;

a lid connected to the base via a hinge portion such that the base and the lid form a foldable structure;

a load cell installed in a backside portion of the lid; and a pressing plate provided on a backside of the lid, having a pressing portion positioned to face a space between the pair of support rollers, and able to press the load cell, wherein the measurement device is capable of holding the belt clamped between the pair of support rollers and the pressing portion.

This configuration, in which the base and the lid form a foldable structure, enables the measurement device to measure a tensile force of each belt being used to lash a cargo, without having to be incorporated in the belt. Further, unlike the known configuration including three rollers, the measurement device of the first aspect of the present invention is capable of holding the belt clamped between the pair of support rollers and the pressing portion. Therefore, this configuration enables an operator to measure a tensile force of a belt while performing a lashing operation even at a place where the belt is fastened and stretched diagonally with respect to a deck.

A second aspect of the present invention is an embodiment of the clamping-type tensile force measurement device according to the first aspect, wherein the lid has a plurality of bosses standing on the lid and surrounding the load cell, the pressing plate has a plurality of through-holes or notches which the bosses penetrate, and each of the bosses is provided with an elastic member which presses the pressing plate toward the load cell.

This configuration, in which the elastic members cause the pressing plate to constantly press the load cell with a predetermined force, may prevent the pressing plate from rattling, which enables an accurate measurement of the tensile force. Note that the pressing force of the elastic members may be suitably adjusted by zero-point adjustment.

A third aspect of the present invention is an embodiment of the clamping-type tensile force measurement device according to the first or second aspect, wherein a shim is interposed between the pressing plate and the load cell or between the lid and the load cell, thereby enabling measurement of the tensile force of different types of belts having different thicknesses.

With this configuration, shim adjustment is performed to measure tensile forces of lashing belts having different thicknesses. As a result, an operator may measure tensile forces of belts of different types having different thicknesses using one single clamping-type tensile force measurement device.

As can be seen from the foregoing, the clamping-type tensile force measurement device of the present invention is capable of holding a belt clamped between the pair of support rollers and the pressing portion, and measuring a tensile force of the belt being pressed by the pressing portion, in a parallel fashion. This configuration enables an operator to measure a tensile force of a belt being used to lash a cargo in parallel with performing an operation of tightening the belt.

DETAILED DESCRIPTION

An embodiment of the present invention will be described below with reference to the drawings.

Figure 1:
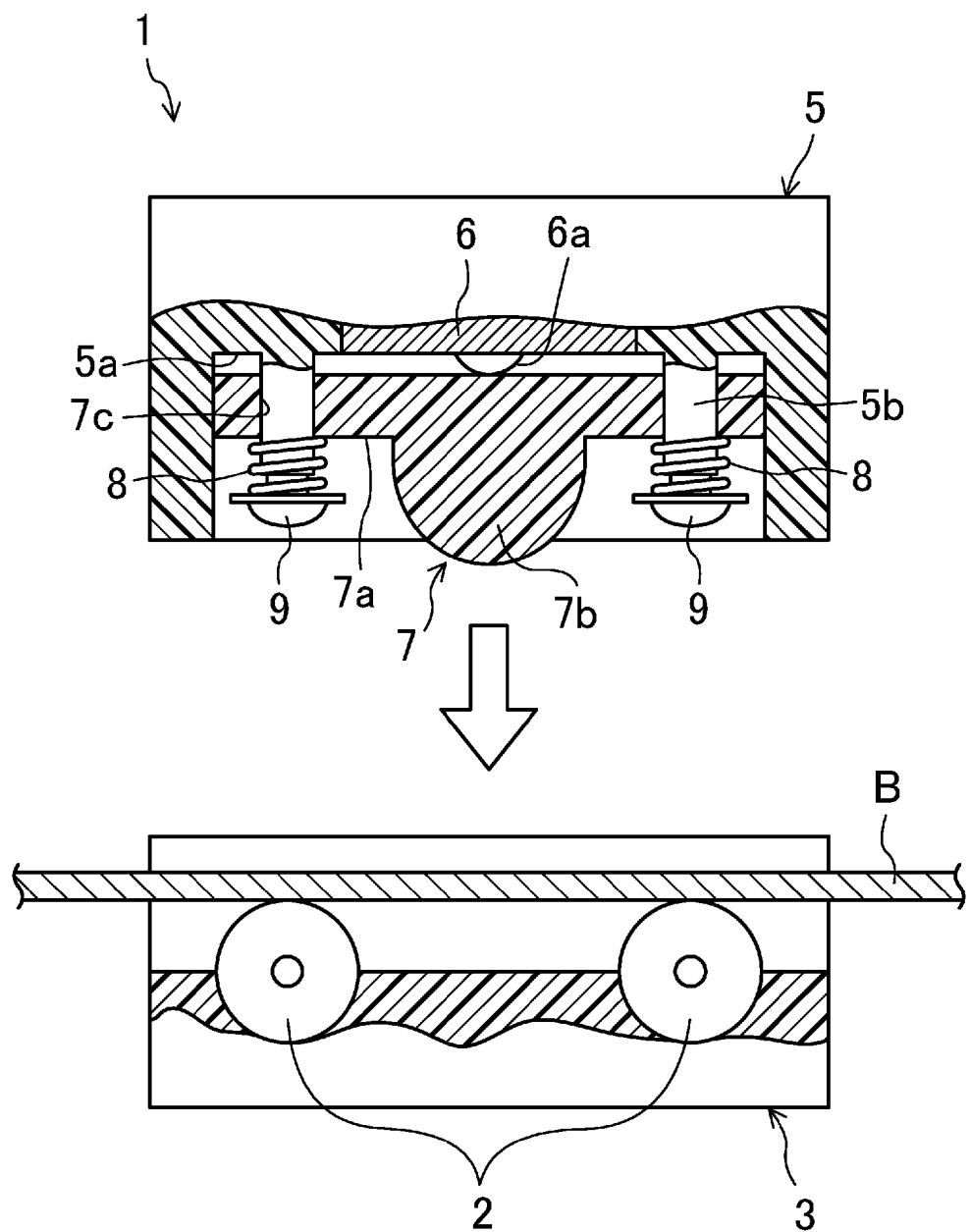
FIG. 1 is a traverse cross-sectional view schematically showing a configuration of a clamping-type tensile force measurement device.
Figure 2:
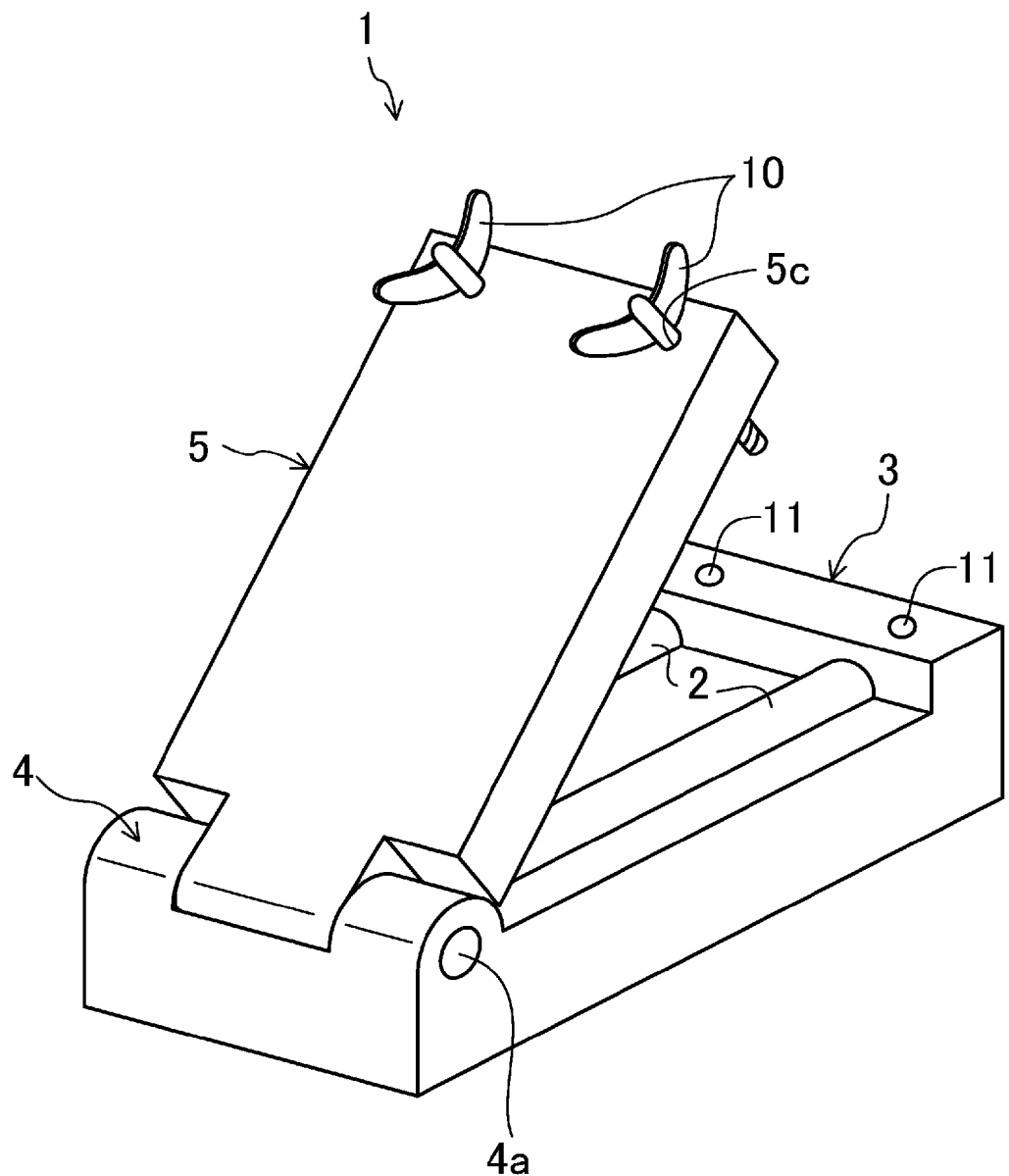
FIG. 2 is a perspective view showing the clamping-type tensile force measurement device in an unfolded state.

FIGS. 1 and 2 show a clamping-type tensile force measurement device 1 according to an embodiment of the present invention. This clamping-type tensile force measurement device 1 is configured to clamp a belt B being used to lash a cargo, and to measure a tensile force of the belt B. Specifically, this clamping-type tensile force measurement device 1 includes a base 3 having a pair of support rollers 2 which are rotatable. The base 3 is made of, for example, a resin or metal molding. The support rollers 2 are made of, for example, phenol resin which is a resin material having a high mechanical strength. Each support roller 2 has an overall length greater than at least the width of the belt B to be measured, and is rotatably supported on the base 3. The outside diameter of each support roller 2 is not particularly limited.

A lid 5 is connected, via a hinge portion 4 having a hinge shaft 4a (made of metal or a resin molding), to the base 3 such that the lid 5 and base 3 form a structure which can be folded and unfolded.

Figure 3:
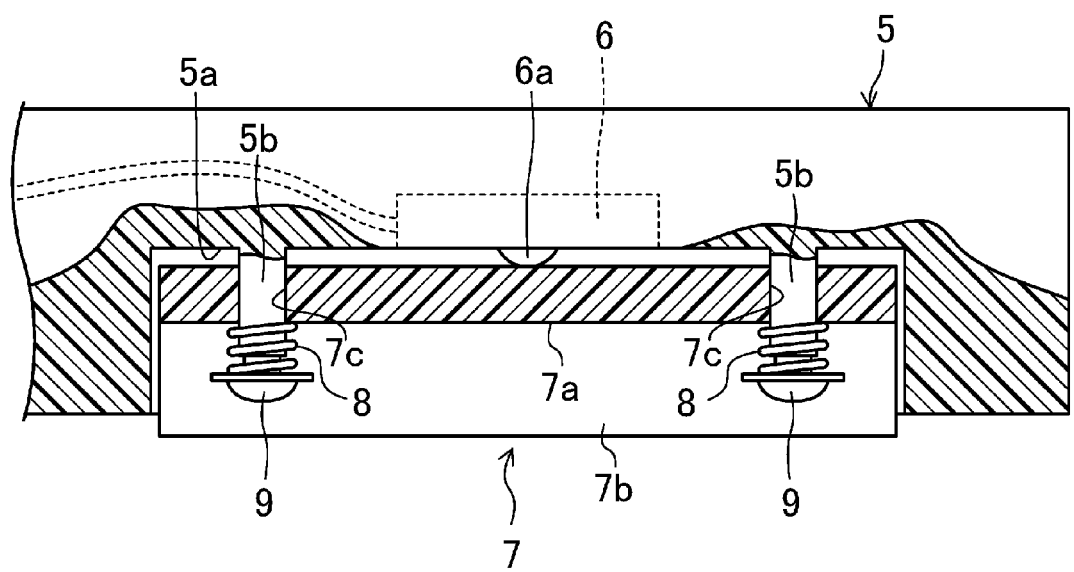
FIG. 3 is a longitudinal cross-sectional view schematically showing a configuration of the clamping-type tensile force measurement device.
Figure 4:
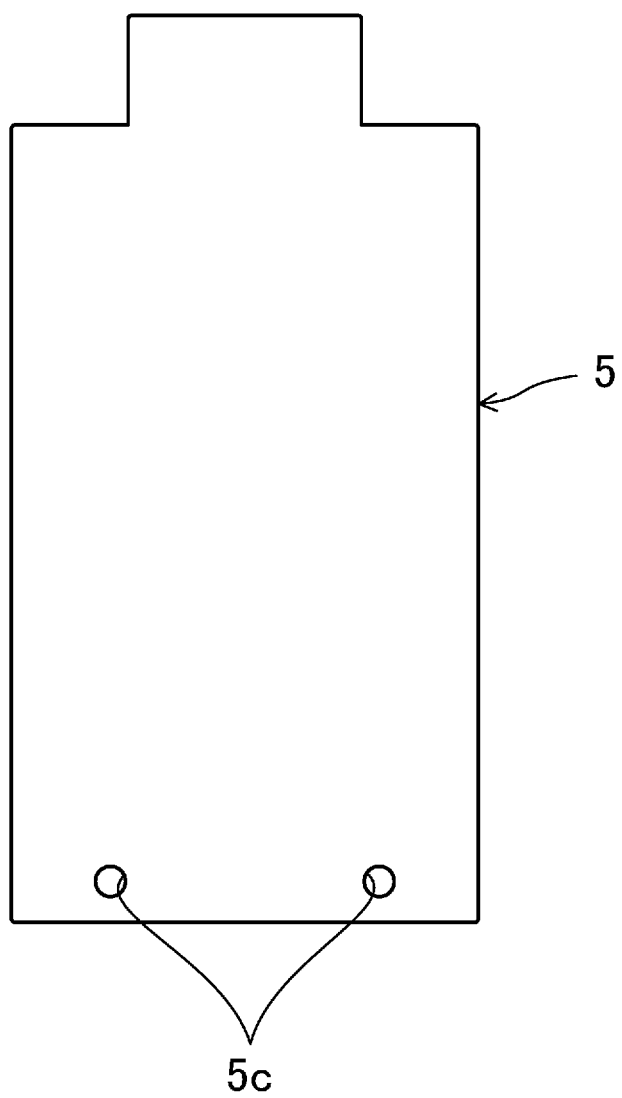
FIG. 4 is a front view of a lid.

As also shown in FIG. 3, the lid 5 is made of, for example, a metal or resin molding. The lid 5 has, on its backside, a plate-housing recess 5a in, for example, a rectangular shape. A load cell 6 is installed in a bottom portion of the plate-housing recess 5a. The load cell 6 is configured as, for example, a small compression-type load cell having a thin cylindrical shape with a diameter of about 20 mm and a thickness of about 10 mm, and capable of measuring force up to approximately 5 KN. The load cell 6 has a detection projection 6a on a center portion of its cylindrical shape.

In the plate-housing recess 5a of the lid 5, a pressing plate 7 having a plate shape is provided to cover the load cell 6. This pressing plate 7 is made of a resin material having a high mechanical strength, such as phenol resin. The pressing plate 7 includes a plate body 7a having a rectangular plate shape, and a semi-cylindrical pressing portion 7b projecting from a surface of the plate body 7a. This pressing portion 7b is positioned to face the space between the pair of support rollers 2, and extends substantially parallel to the pair of support rollers 2. The pressing portion 7b has a length equivalent to that of the support rollers 2, and may have a radius equal to, larger or smaller than that of the support rollers 2. However, the pressing portion 7b is not rotatable, unlike the support rollers 2. The plate body 7a is configured to press, with its flat surface opposite to the pressing portion 7b, the detection projection 6a of the load cell 6.

Further, for example, four bosses 5b stand on the plate-housing recess 5a of the lid 5, and surround the load cell 6.

On the other hand, the pressing plate 7 has four through-holes 7c which the bosses 5b penetrate. Instead of the through-holes 7c, notches may be formed in the pressing plate 7.

Each boss 5b is provided with a compression coil spring 8 which functions as an elastic member to press the pressing plate 7 toward the plate-housing recess 5a (i.e. toward the load cell 6). Each compression coil spring 8 is prevented by, for instance, a bolt and washer assembly 9 from being detached, and the pressing force of each compression coil spring 8 is adjustable. Thus, the pressing plate 7 is caused to constantly press the load cell 6 with a predetermined force, which prevents the pressing plate 7 from rattling. Each boss 5b is designed to have a relatively small height, and the pressing force of each compression coil spring 8 can be adjusted by tightening or loosening the associated bolt and washer assembly 9. The pressing force of each compression coil spring 8 is suitably adjusted by zero-point adjustment.

Although not shown in detail in the drawings, a shim for thickness adjustment may be interposed between the pressing plate 7 and the load cell 6 so as to adjust the positional relation between the pressing portion 7b and the pair of support rollers 2 in a folded state where the lid 5 is closed. This configuration enables the measurement device to measure belts B having different thicknesses. Like the plate body 7a, the shim has through-holes or notches corresponding to the bosses 5b.

As shown in FIG. 2, the lid 5 has bolt insertion holes 5c formed therein and located opposite to the hinge portion 4, and, for example, two thumbscrews 10 functioning as lock members are provided in the bolt insertion holes 5c. In correspondence with the thumbscrews 10, screw holes 11 are formed in the base 3. Although the positions of the screw holes 11 are not particularly limited, the screw holes 11 of this embodiment are formed, for example, near the pair of support rollers 2. Each thumbscrew 10 may be replaced with a cylindrical head screw having asperities on the peripheral surface of the head. Each lock member may be configured as one having the shape of a clamping clip.

Next, it will be briefly described how to use the clamping-type tensile force measurement device 1 of this embodiment.

First, a cargo is provisionally secured to a transportation means such as a truck, a boat, or a container, by using a belt B. Tightening the belt B is implemented by pulling the belt B using a buckle, or by using a dedicated handle-type lashing device. Usually, the belt B is stretched diagonally with respect to the deck of the transportation means in order to secure the cargo.

At this time or during the provisional securing operation, the tensile force of the belt B is measured.

Specifically, as shown in FIG. 1, in a state where the pair of support rollers 2 is in contact with the backside of the belt B, the lid 5 is closed and the thumbscrews 10 are fastened such that the belt B is clamped with both its sides being in contact with the measurement device 1. At this time, performing shim adjustment enables a single clamping-type tensile force measurement device 1 to measure the tensile forces of multiple lashing belts B having different thicknesses.

Even if an operator relinquishes his/her hold of the clamping-type tensile force measurement device 1, the device 1 does not slip thanks to the configuration in which the pressing portion 7b does not include a roller structure.

Next, while measuring the tensile force with the clamping-type tensile force measurement device 1, the operator manipulates the handle of the lashing device to tighten the belt B until the tensile force reaches a desired value.

When tightening is completed, the operator loosens the thumbscrews 10 and removes the clamping-type tensile force measurement device 1 in order to measure a tensile force of another belt B.

As can be seen, the measurement device 1 of this embodiment is capable of measuring the tensile force of the belt B while holding the belt B clamped between the pair of support rollers 2 and the pressing portion 7b.

Since the lid 5 and the base 3 form a structure which can be folded and unfolded, measurement of a tensile force may be performed without having to incorporate the measurement device 1 in the belt B being used for lashing a cargo.

Unlike the known configuration including three rollers, the measurement device 1 is capable of holding a belt B clamped between the pair of support rollers 2 and the pressing portion 7b. Therefore, even at a place where the belt B being used to lash a cargo is stretched diagonally, an operator may perform measurement of a tensile force in parallel with the lashing operation.

Thus, the clamping-type tensile force measurement device 1 of this embodiment is capable of measuring a tensile force of the belt B pressed by the pressing portion 7b while holding the belt B clamped between the pair of support rollers 2 and the pressing portion 7b. Therefore, the measurement device 1 of this embodiment enables an operator to measure the tensile force of the belt B being used to lash a cargo, in parallel with performing the operation of tightening the belt.

Note that the embodiment described above is merely a preferred example in nature, and is not intended to limit the scope, application, or uses of the present invention.

For example, although the shim for thickness adjustment is interposed between the pressing plate 7 and the load cell 6 in the embodiment described above, the shim for thickness adjustment may as well be interposed between the lid 5 and the load cell 6.

As described above, the present invention is useful for a clamping-type tensile force measurement device for measuring tensile force of a belt being used to lash a cargo.

What is claimed is:

1. A clamping-type tensile force measurement device for clamping a belt being used to lash a cargo and measuring tensile force of the belt, the measurement device comprising:
   a base having a pair of support rollers which are rotatable;
   a lid connected to the base via a hinge portion such that the base and the lid form a foldable structure;
   a load cell installed in a plate-housing recess of a backside portion of the lid; and
   a pressing plate having a plate shape, provided in the plate-housing recess of the backside portion of the lid to cover the load cell, having a pressing portion positioned to face a space between the pair of support rollers, and able to press the load cell, wherein
   the measurement device is capable of holding the belt clamped between the pair of support rollers and the pressing portion.

2. A clamping-type tensile force measurement device for clamping a belt being used to lash a cargo and measuring tensile force of the belt, the measurement device comprising:
   a base having a pair of support rollers which are rotatable;
   a lid connected to the base via a hinge portion such that the base and the lid form a foldable structure;
   a load cell installed in a backside portion of the lid; and
   a pressing plate provided on a backside of the lid, having a pressing portion positioned to face a space between the pair of support rollers, and able to press the load cell, wherein
   the measurement device is capable of holding the belt clamped between the pair of support rollers and the pressing portion,
   the lid has a plurality of bosses standing on the lid and surrounding the load cell,
   the pressing plate has a plurality of through-holes or notches which the bosses penetrate, and
   each of the bosses is provided with an elastic member which presses the pressing plate toward the load cell.

3. A clamping-type tensile force measurement device for clamping a belt being used to lash a cargo and measuring tensile force of the belt, the measurement device comprising:
   a base having a pair of support rollers which are rotatable;
   a lid connected to the base via a hinge portion such that the base and the lid form a foldable structure;
   a load cell installed in a backside portion of the lid; and
   a pressing plate provided on a backside of the lid, having a pressing portion positioned to face a space between the pair of support rollers, and able to press the load cell, wherein
   the measurement device is capable of holding the belt clamped between the pair of support rollers and the pressing portion, and
   a shim is interposed between the pressing plate and the load cell or between the lid and the load cell, thereby enabling measurement of the tensile force of different types of belts having different thicknesses.

4. The clamping-type tensile force measurement device of claim 2, wherein
   a shim is interposed between the pressing plate and the load cell or between the lid and the load cell, thereby enabling measurement of the tensile force of different types of belts having different thicknesses.

* * * * *